United States Patent [19]

Weisburger et al.

[11] Patent Number: 4,777,052
[45] Date of Patent: Oct. 11, 1988

[54] METHOD OF TREATING A FOODSTUFF TO INHIBIT THE DEVELOPMENT OF MUTAGENS AND RELATED PRODUCT

[75] Inventors: John Weisburger, White Plains; Ronald C. Jones, New York, both of N.Y.

[73] Assignee: American Health Foundation, New York, N.Y.

[21] Appl. No.: 659

[22] Filed: Jan. 6, 1987

[51] Int. Cl.$^4$ .................. A23L 1/305; A23L 1/314; A23L 3/34
[52] U.S. Cl. .................................. 426/92; 426/323; 426/332; 426/657; 426/652; 426/302; 426/310; 514/323; 514/332
[58] Field of Search ................. 426/92, 323, 332, 657, 426/652, 302, 310; 514/332, 323

[56] References Cited

U.S. PATENT DOCUMENTS

| | | | |
|---|---|---|---|
| 3,681,095 | 8/1972 | Inklaar | 426/323 |
| 3,840,676 | 10/1974 | Yamamoto et al. | 426/92 |
| 3,911,146 | 10/1975 | Hara et al. | 426/332 |
| 4,521,435 | 6/1985 | Peters | 426/92 |

OTHER PUBLICATIONS

The Merck Index, Merck & Co. Inc., 1968, Rahway, N.J., p. 1086.

Primary Examiner—Jeanette Hunter
Attorney, Agent, or Firm—Roberts, Spiecens & Cohen

[57] ABSTRACT

L-Tryptophan is applied to foodstuff to prevent the development of mutagens/carcinogens. Before the cooking of a foodstuff such as hamburger, L-Tryptophan is applied to the surfaces thereof to inhibit, for example, the generation of IQ type carcinogens. The L-Tryptophan can be sprinkled on the surface of the foodstuff or incorporated into a sauce which is applied to the foodstuff or put into solution in water or the like.

22 Claims, 3 Drawing Sheets

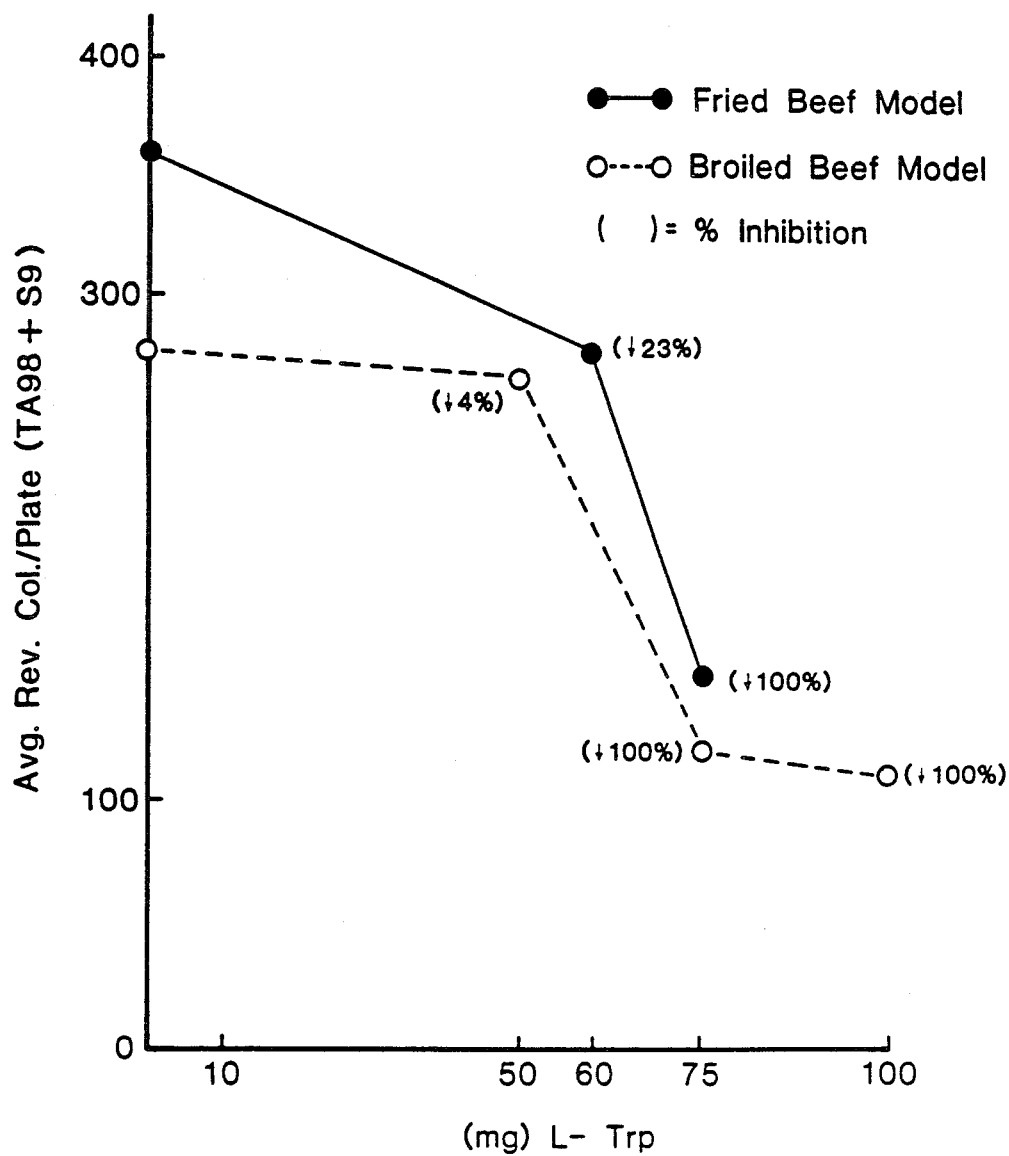

METHOD OF TREATING A FOODSTUFF TO INHIBIT THE DEVELOPMENT OF MUTAGENS AND RELATED PRODUCT

FIELD OF INVENTION

This invention relates to the processing of foodstuffs and more particularly to the processing of foodstuffs to avoid the generation of mutagens/carcinogens. The invention also relates to products applicable to foods to avoid the generation of mutagens or carcinogens therein.

BACKGROUND

Specific heterocyclic amines are a potent class of foodborne mutagens/carcinogens that are produced by the frying or broiling of meats or fish, heating or meat extracts, and refluxing of appropriate precursor substrates in liquid-reflux model systems. (Sugimura, T. and Sato, S. (1983) Mutagens-carcinogens in foods. *Cancer Res.*, 43, 2415s–2421s; Vuolo, L. L. and Schuessler, G. J. (1985) Review: Putative mutagens and carcinogens in foods. VI. Protein pyrolysate products. *Environ. Mutagenesis*, 7, 577–598; Prival, J. J. 1984) Carcinogens and mutagens present as natural components of food or induced by cooking. *Nutr Cancer*, 6, 236–253; Felton, J. S., Knize, M. G., Wood, C., Wuebbles, D. J., Healy, S. K., Stuermer, D. H., Bjeldanes, L. F., Kimble, B. J., and Hatch, F. T. (1984) Isolation and characteristics of new mutagens from fried ground breef. *Carcinogenesis*, 5, 95–102; Matsushima, T. (1982) Mechanisms of conversion of food components to mutagens and carcinogens. In Arnott, M. S., van Eys, J., Wang, Y.-M. (eds). *Molecular Interrelations of Nutrition and Cancer*. Raven Press, New York, pp. 507–519; Grivas, S., Nyhammar, T., Olsson, K., and Jagerstad, M. (1985) Formation of a new mutagenic $DiMeIQ_x$ compound in a model system by heating creatinine, alanine and fructose. *Mutat. Res.*, 151, 177–183; Tanaka, T., Barnes, W. S., Weisburger, J. H. and Williams, G. M. (1985) Multipotential carcinogenicity of the fried food mutagen 2-amino-3-methylimidazo[4,5-f]quinoline in rats. *Jpn. J. Cancer Res. (Gann)*, 76, 570–576; Knudsen, I., ed. (1985) *Genetic Toxicology of the Diet*. Alan R. Liss, New York). 2-Amino-3-methylimidazo[4,5-f]quinoline (IQ), 2-amino-3,8-dimethylimidazo[4,5-f]quinoxaline ($MeIQ_x$), and 3,4,8-trimethylimidazo-[4,5-f]quinoxaline (4,8-$DiMeIQ_x$) are some of the most potent members of this class.

IQ-activated H-ras oncogene has been found in rat hepatocellular carcinoma and sarcoma. (Ishikawa, F., Takalcu, F., Nagao, M., Ochiai, M., Hayashi, K., Takayama, S. and Sugimura, T. (1985) Activated oncogenes in a rat hepatocellular carcinoma induced by 2-amino-3-methylimidazo[4,5-f]quinoline. *Jpn. J. Cancer Res. (Gann)*, 76, 425–428). The IQ-type mutagens, when administered orally, have recently been conclusively demonstrated to be multipotntial carcinogens in rodents, producing neoplasms of the mammary gland, intestine, pancreas, liver, lung, and urinary bladder. (Tanaka, T., Barnes, W. S., Weisburger, J. H. and Williams, G. M. (1985) Multipotential carcinogenicity of the fried food mutagen 2-amino-3-methylimidazo[4,5-f]quinoline in rats. *Jpn. J. Cancer Res. (Gann)*, 76, 570–576; Sugimura, T. (1985) Carcinogenicity of mutagenic heterocyclic amines formed during the cooking process. *Mutat. Res.*, 150, 33–41).

It has been contended that these carcinogens may be the causative agents for major, nutritionally-linked human cancers of the breast, colon, and pancreas, where dietary fat can play a second-stage, promotional role. (Weisburger, J. H. (1977) Current views on mechanisms concerned with the etiology of cancers in the digestive tract. In Farber, E. et al. (eds). *Pathophysiology of Carcinogenesis in Digestive Organs*. Univ. Tokyo Press, Tokyo, pp. 1–20). These cancers are among the neoplastic diseases having the highest incidence in the United States. (Silverberg, E. (1985) Cancer statistics. *Ca-A Cancer J. Clinicians*, 35, 5–21). A recent comprehensive review of this subject has just been published by Furihata and Matsushima. Furihata, C. and Matsushima. (Matsushima, T. (1986) Mutagens and carcinogens in foods. *Ann Rev. Nutr.*, 6, 67–94).

SUMMARY OF INVENTION

An object of the present invention is to provide means for inhibiting the production of those important carcinogens, based on their proposed mechanism of formation, the Maillard browning, and like reactions (Waller, G. R. and Feather, M. S., eds. (1983) The Maillard Reaction in Foods and Nutrition, ACS Symp. Series 215. American Chemical Society, Washington, D.C., pp. 485–506, 507–519). In accordance with the invention, it is established that L-tryptophan (L-trp) is an excellent inhibitor in various environments, including liquid-reflux models and in the actual frying and broiling of foodstuffs such as meat and fish.

It is a further object of the invention to provide an improved product for application to foodstuffs for inhibiting the production of mutagens and carcinogens during the cooking of the same.

In achieving the above and other objects of the invention, according to the method aspect thereof, there is provided a method which comprises inhibiting the development of mutagens/carcinogens during the cooking of a foodstuff by applying L-tryptophan to the same. The foodstuff may be broiled or fried or prepared in other ways requiring the application of heat and the L-trp is preferably applied to the surface of the foodstuff being processed. The L-trp may be sprinkled on the foodstuff or incorporated into a liquid flavoring agent which is applied to the foodstuff. As will be mentioned below, the flavoring agent may be, for example, a commercially available steak sauce, or the like.

More specifically, the L-trp is preferably applied in an amount greater than the order of magnitude of 1.0 mg. per cm sq. The L-trp may be incorporated in a carrier such as water or a sauce as aforesaid. The foodstuff is preferably beef, but may also be lamb, fowl, pork or fish, or other proteinous substances. In certain instances, L-trp may be employed in conjunction with starch in other types of foodstuffs since, for example, in the toasting of bread, or the like, a certain amount of mutagens/carcinogens may be generated.

The resulting and processed foodstuff is a foodstuff which has reacted to the application of heat thereto, but which is notably more free of mutagens/carcinogens than has heretofore been believed possible.

The above and other objects, features and advantages of the invention will be found in the Detailed Description which follows hereinafter as illustrated by the accompanying drawing.

BRIEF DESCRIPTION OF DRAWING

In the drawing:

FIG. 3 is a chart illustrating dose-dependent inhibition of IQ-type mutagenicity in fried and broiled beef.

IQ-type mutagenicity and carcinogenicity is typically that found in a series of compounds structurally related to IQ, including but not limited to the 2-amino-3-methylimidazo[4,5-f]quinolines and quinoxalines, that are formed during various cooking procedures.

The specimens cooked and processed were done under highly controlled laboratory conditions with specific sample sizes. The procedures, however, will work, as described, on other sample sizes.

DETAILED DESCRIPTION

Figure 1:
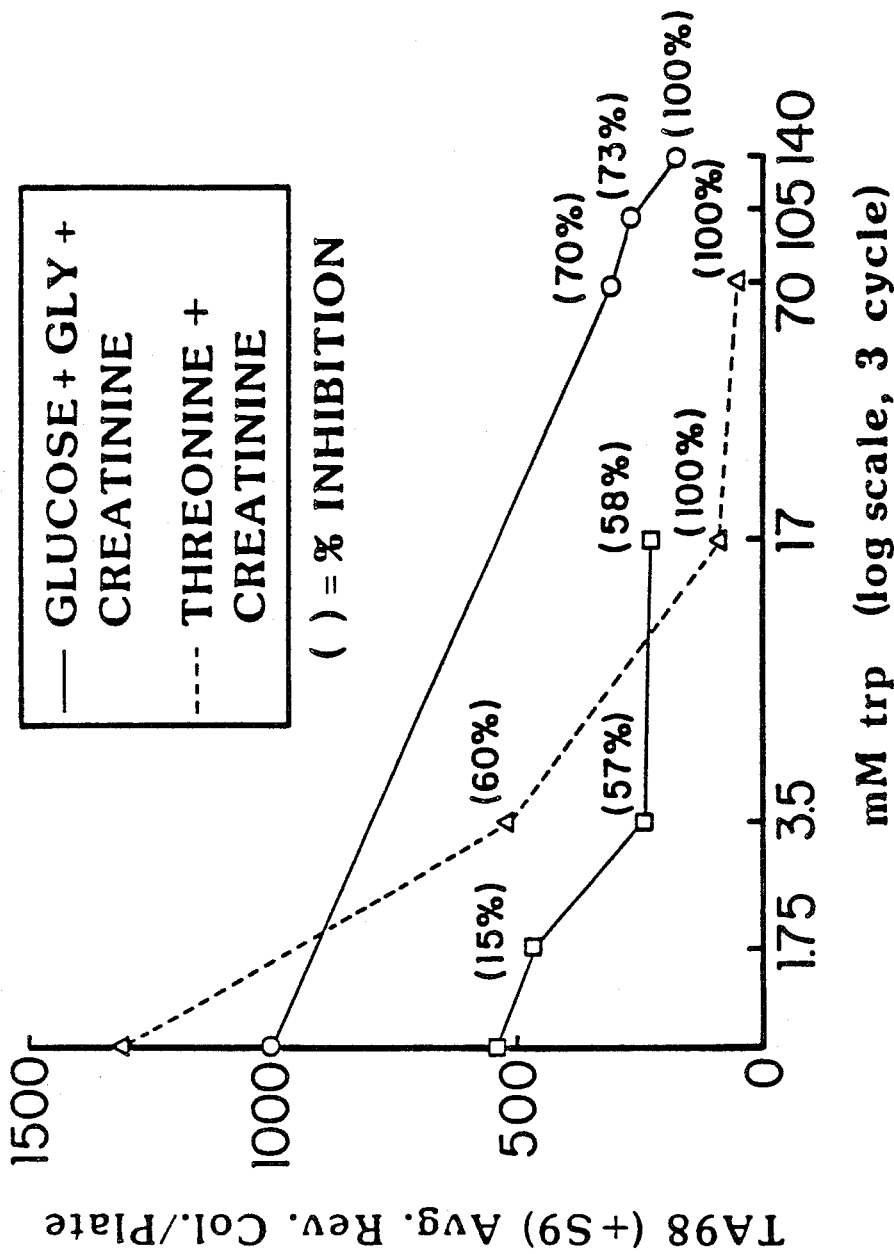
FIG. 1 is a chart illustrating the inhibition of mutagenicity in liquid reflux models.

FIG. 1 shows an inhibition of mutagenicity by L-trp in liquid-reflux models. Numbers in parentheses are percent of inhibition; solid lines, complete model=-glucose+glycine and creatinine; dashed lines, critical model=threonine+creatinine. Substrates glucose (35 mM)+gly (70 mM)+creatinine (70 mM), or threonine (70 mM)+creatinine (70 mM) are refluxed in diethylene glycol (DEG): 5% distilled water (60 ml total volume) at 150° C. for 2 hours. Number of revertant colonies/plate must be triple that of DEG control values to be considered significant.

Figure 2:
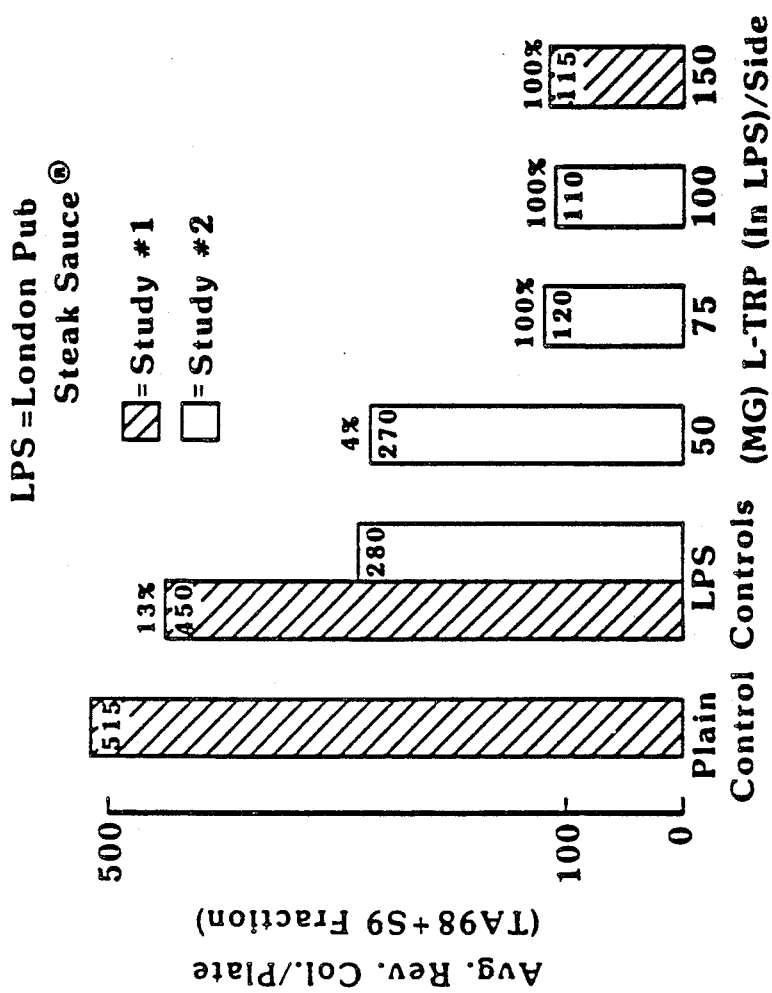
FIG. 2 is a chart illustrating the inhibition of IQ-type mutagenicity by different dosages of L-trp.

FIG. 2 shows an inhibition of IQ-type mutagenicity by L-trp applied in a commercial steak sauce during broiling of lean ground beef. Shaded bars represent a first study (#1), while open bars represent a second study (#2). % Figures over bars=% inhibition, and numbers within bars are actual avg. rev. col./plate obtained when L-trp was mixed into commercial steak sauce (SS=LPS) at 0, 50, 75, 100, and 150 mg/2.5 ml of sauce/side (0–2.0% mg L-trp/$cm^2$ patty surface area/side). 100% inhibition was achieved at 75 mg L-trp in 2.5 ml of SS/side (1.04 mg/$cm^2$). In both studies, #1 and #2, patties were broiled for 5 min/side at 235° C., in an overhead gas broiler.

FIG. 3 shows L-trp was blended into a commercial steak sauce at concentrations of: (1) 50, 75, and 100 mg in 2.5 ml of sauce/side, and applied to both meat surfaces prior to initial broiling (o—o) at 235° C., or (2) 60 and 75 mg in 2.5 ml of sauce side, and applied to both meat surfaces prior to initial frying (o—o) at 220° C. In both models, patties were cooked for 5 minutes/side. Percent inhibition of mutagenicity is noted in parenthesis. Dose-dependent inhibition of IQ-type mutagenicity was similar in both models with 100% inhibition at 75 mg L-trp in 2.5 ml of sauce/side.

Liquid-Reflux Models

Millimolar (mM) concentrations of various ingredients, such as glucose, glycine, creatinine with or without inhibitory test agent, were added to a medium consisting of diethylene glycol (DEG): 5% water (60 ml total volume), and refluxed for 2 hours at 150° C. The reflux models employed below were: (1) glucose (35 mM)+glycine (70 mM)+creatinine (70 mM)="complete" model, and (2) a new model discovered during these studies: threonine (70 mM)+creatinine (70 mM)="critical" model.

Preparation of "standard" lean-ground beef patties

Patties 3 mm in thickness and 9.6 cm in diameter (72.35 $cm^2$ surface area/side) were prepared from 50 grams of store-bought 85% lean-ground beef using a glass Petri dish cover (1.5×9.6 cm, I.D.) as a mold. Inhibitor-treated and untreated patties were then either fried or broiled 5 minutes/side in all studies.

Frying and broiling methods

Frying study. Patties were fried, 5 minutes per side, in a Teflon-coated electric fry pan preheated for 20 minutes at 220° C. (maximum setting).

Broiling study

Patties were broiled in an overhead gas flame broiler (fixed flame setting), with the broiler tray placed in the lowest position (16 cm below the flame). The broiler was preheated for 20 minutes before use.

Temperature monitoring

A Digital Thermocouple Probe (model #8520-50, Cole-Palmer Instrument Co., Chicago, Ill.) was used to monitor interface temperatures as a function of time during frying, and interface as well as patty upper surface temperatures during gas broiling.

XAD-2 fractionation and acid/base partitioning

Threonine (70 mM) and creatinine (70 mM) were refluxed for 2 hours at 150° C. in DEG: 5% water. 15 ml of the final reflux sample, containing an unknown quantity of threonine/creatinine mutagenic product (TCP) was diluted with 10 volumes of distilled water ($DH_2O$) and concentrated on a small (1×32 cm) column of clean XAD-2 resin, as per Bjeldanes et al. (Bejeldanes, L. F., Grose, K. R., Davis, P. H., Stuermer, D. H., Healty, S. K., and Felton, J. S. (1982) An XAD-2 resin method for efficient extraction of mutagens from fried ground beef. *Mutat. Res.*, 105, 43–49). Mutagenic TCP was eluted from the XAD-2 with 3 bed volumes (40 ml) of acetone and rotary evaporated in vacuo to dryness. The resulting residue was redissolved in 33 ml of 1N HCl, extracted twice in a separatory funnel with 2 volumes (70 ml) of (2:1) methylene chloride:methanol (MeOH) each, and once with 2 volumes of methylene chloride ($CH_2Cl_2$). After each extraction, the bottom organic layer containing neutral and acidic compounds was discarded, and the upper aqueous layer saved for further extraction, as modified per Felton et al. (Felton, J. S., Healy, S., Stuermer, D., Berry, C., Timourian, H., Hatch, F. T., Morris, M., and Bjeldanes, L. F. (1981) Mutagens from the cooking of food. I. Improved isolation and characterization of mutagenic fraction from cooked ground beef. *Mutat. Res.*, 88, 33–44; Felton, J. S., Knize, M. G., Wood, C., Wuebbles, B. J., Healy, K. S., Stuermer, D. H., Bjeldanes, L. F., Kimble, B. J., and Hatch, F. T. (1984) Isolation and characterization of new mutagens from fried ground beef. *Carcinogenesis*, 5, 95–102) and Commoner et al. (Commoner, B., Vithayathil, A. J., Dolara, P., Nair, S., Madyastha, P., and Cuca, G. C. (1978) Formation of mutagens in beef and beef extract during cooking. *Science*, 201, 913–916). The final aqueous layer was then adjusted to pH 10 with 8N NaOH, and re-extracted 3 times, as described above. The pooled $Ch_2Cl_2$ basic extract (bottom layer), known to contain the heterocyclic amine mutagens, when present, was rotary evaporated to dryness, and redissolved in 2 ml of dimethylsulfoxide (DMSO) for mutagenicity testing by Ames assay using tester strain TA98+S9 fraction.

Homogenization and acid/base partitioning of fried or broiled ground beef

Each patty, L-trp-treated or untreated, was homogenized in 4 volumes (90 ml) of acetone, using a blender speed of 18,000 rpm ("liquefy" setting) for 60 seconds (3 times). The acetone extract was vacuum filtered through Whatman No. 1 filter paper and a sintered glass funnel. The filtered residue was stirred with 100 ml of acetone for 30 minutes, and refiltered as described above. The filtrates were pooled and placed in a cold room at 4° C. for 5 hours to overnight to congeal sample lipids. Congealed samples were then refiltered and the acetone filtrate rotary evaporated to near dryness. The residue was dissolved in 33 ml 1N HCl and processed through acid/base partitioning, as per the method described above for threonine+creatinine reflux sample. The resultant basic extract was rotary evaporated to dryness, redissolved in 10 ml of methanol, and the sample injected through a methanol washed $C_{18}$ Sep-Pak cartridge using a glass syringe to remove residual lipids. The Sep-Pak filtered sample in methanol was then evaporated to dryness by a stream of nitrogen and redissolved in 1.0 ml of DMSO for Ames assay (TA98+S9).

Acidic nitrosation procedure

Selected broiled beef patty basic extracts, with or without L-trp treatment, were nitrosated at pH 1.0, as per Tsuda et al. (Tsuda, M., Negishi, C., Makino, R., Sato, S., Yamaizumi, Z., Hirayama, T. and Sugimura, T. (1985) Use of nitrite and hypochlorite treatments in determination of the contributions of IQ-type and non-IQ-type heterocyclic amines to the mutagenicities in crude pyrolyzed materials, *Mutat. Res.*, 147, 335–341), to discriminate between IQ and non-IQ-type of mutagens. After Sep-Pak $C_{18}$ filtration of sample basic extract in methanol, ½ of the filtrate from each sample was nitrogen evaporated to dryness and redissolved in 0.5 ml DMSO for Ames assay (TA98+S9). The other half of each sample was handled in the same way, except that the SMSO preparation (0.5 ml) was treated with 4.9 ml of 0.1N HCl and 0.1 ml of 0.1M $NaNO_2$. The acidic mixture was incubated for 30 minutes at 37° C., and the nitrosation reaction stopped by neutralization to pH 7.0 with the addition of 2N NaOH. The sample was then passed through a 0.45 μm Millipore filter using a glass syringe, collected in a test tube, and nitrogen evaporated to dryness. The residue was redissolved in 5 ml of methanol, nitrogen evaporated to dryness, and solubilized in DMSO for Ames assay (TA 98+S9). If carboline mutagens have contributed to overall mutagenicity due to the presence of added L-trp, then acidic nitrosation of sample basic extract would result in fewer average revertant colonies/plate, or an increase in % inhibition by L-trp.

Mutagenicity assays

Ames *Salmonella typhimurium* tester strain TA98 was used in all assays for mutagenicity, and strains TA100, TA1538, and TA1535 were used additionally in selected studies. The S9 mix utilized in all assays contained 50 μl of S9 fraction/ml of S9 mix. The S9 fraction (40 mg protein/ml) was derived from Arachlor 1254-induced rat liver.

The assay was conducted by the addition of 0.1 ml of overnight culture of an appropriate tester strain to 0.5 ml of S9 mix, and either 100 μl of reflux sample, or a known concentration of IQ-mutagen reference compound in DEG or DMSO, then applied. The mixture was then incubated in a 37° C. water bath for 20 minutes. Molten top agar was added, and the mixture overlayed onto Vogel-Bonner agar plates. Plates were incubated at 37° C. for 48 to 72 hours. Results are expressed as average (avg.) revertant colonies/plate, as determined on an Artek Model 880 automatic colony counter. Average number of rev. col./plate must be triple that of medium (DEG or DMSO) control values to be considered significant. These determinations were performed by the In Vitro Systems Facility of the Naylor Dana Institute of White Plains, New York.

In the case of XAD-2 concentrated/acid base partitioned reflux samples, sample residue was redissolved in DMSO prior to removal of 100 μl aliquots for assay. All assays werre conducted in triplicate.

Procedure 1

The "complete" liquid- reflux model, consisting of glucose (35 mM)+glycine (70 mM)+creatinine (70 mM), was selected for use because the specific mutagens produced have been identified as 75% $MeIQ_x$ and 25% 7,8-$DiMeIQ_x$ by Jagerstad et al. (Jagerstad, M., Grivas, S., Olsson, K., Reutersward, A. L., Negishi, C., and Sato, S. (1986) Formation of food mutagens via Maillard reactions. In I. B. Knudsen (ed.), *Progress in Clinical and Biological Research, vol. 206, Genetic Toxicology of the Diet.* Alan R. Liss, Inc., New York, pp. 155–167). The "critical" model, threonine (70 mM)+creatinine (70 mM) provided for a simple, 2-component model of IQ-type mutagenicity, although the specific mutagenic product(s) is unknown. L-trp was added to each of the reflux models at several concentrations, ranging from 1.75 to 140 mM.

Procedure 2

"Standard" 50 gram lean-ground beef patties were treated with 2.5 ml of a commercial steak sauce (2.5 ml of SS/side), to which had been added 0, 50, 75, 100, or 150 mg L-trp applied to both sides of the patty prior to initial broiling at an average temperature of 235° C. over a total of 10 minutes cooking time (5 min./side). After broiling, patties were homogenized in acetone and acid/base partitioned to basic extract in DMSO for Ames mutagenicity assay (TA 98+S9). Additionally, ½ of the basic extract from the patty treated with 150 mg L-trp in 2.5 ml SS/side (2.07 mg/$cm^2$ surface area) was treated by acidic nitrosation to test for the presence of L-trp-derived carboline (non-IQ) type mutagens. (Tsuda, M., Negishi, C., Makino, R., Sato, S., Yamaizumi, Z., Hirayama, T. and Sugimura, T. (1985) Use of nitrite and hypochlorite treatments in determination of the contributions of IQ-type and non-IQ-type heterocyclic amines to the mutagencities in crude pyrolyzed materials. Mutat. Res., 147, 335–341).

Procedure 3

"Standard" lean-ground beef patties were treated with 2.5 ml of SS/side, or 2.5 ml of SS to which had been added either 60 or 75 mg of L-trp (0.83 and 1.04 mg L-trp/$cm^2$), respectively) that was applied to both sides prior to initial frying of either side. Patties were fried in an electric frypan at an average temperature of 220° C. over 10 minutes total cooking time (5 min./side).

RESULTS

Procedure 1

When the concentration of added L-trp was varied from 1.75 to 140 mM in the complete liquid reflux mode, IQ-type mutagenicity was inhibited, in a dose-dependent fashion, over a range of 15 to 100% (FIG. 1; Table 1). L-trp also inhibited the IQ-type mutagenicity in the critical model in a dose-dependent fashion, from 3.5 mM (60% inhibition: 1290→515 avg. rev. col./plate) to 70 mM (100% inhibition: 1290→40 avg. rev. col./plate) (FIG. 1; Table 1). In controls, the substitution of 70 mM L-trp for 70 mM glycine in the glucose+glycine+creatinine model, or for 70 mM threonine (thr) in the critical model, resulted in no significant level of mutagenicity in either system: 45, and 80 avg. rev. col./plate, respectively.

Procedure 2

In the broiled beef model, where L-trp was mixed into steak sauce (SS) at various concentrations, and applied to both sides of 50 gram lean-ground beef patties prior to initial broiling, L-trp inhibited the formation of IQ-type mutagenicity, in a dose-dependent fashion, up to 100% at 75 mg of L-trp in 2.5 ml of SS/side (1.04 mg/cm$^2$) (FIG. 2; Table 2). Plain, untreated (without SS) control patty basic extract produced 515* avg. rev. col./plate, while untreated SS controls produced around 450* (a 13% reduction in mutagenic yield). Relative to either of these controls, 75 mg of L-trp in 2.5 ml SS/side resulted in a 100% inhibition of formation of IQ-type mutagenicity (120 avg. rev. col./plate).

While basic extract from patties treated on both sides with 150 mg L-trp in 2.5 ml SS/side (2.07 mg/cm$^2$) prior to initial broiling resulted in 110 avg. rev. col./plate (100% inhibition), acidic nitrosation of this same extract resulted in 260* avg. rev. col./plate (a 42% inhibition). Had a significant level of carboline-type mutagens (Trp-P-1, Trp-P-2) been generated due to pyrolysis of the added L-trp under the broiling conditions of the present study (235° C.), then acidic nitrosation would have resulted in fewer avg. rev. col./plate (<110), not 250*; or in greater than 100% inhibition by L-trp. Thus, the data indicate no formation of significant levels of non-IQ (carboline) type mutagens present in the L-trp-treated broiled beef basic extract.

Procedure 3

In the fried beef model, L-trp inhibited the formation of IQ-type mutagenicity, in a dose-dependent fashion, up to 100% at 75 mg L-trp in 2.5 ml SS/side (1.04 mg/cm$^2$) (Table 2). 60 mg L-trp in 2.5 ml SS/side (0.83 mg/cm$^2$) resulted in 23% inhibition compared with only 4% inhibition at 50 mg L-trp in 2.5 ml SS/side (0.69 mg/cm$^2$) in the broiled beef model. In both the broiled and fried beef models, both surfaces were treated prior to the start of cooking. The "dose-response" surves from both studies are quite similar, and in both a very sharp inhibitory response occurs between 50 and 75 mg of L-trp in 2.5 ml SS/side, or 100–150 mg total L-trp/patty (FIG. 3).

TABLE I

Inhibition of mutagenicity by L-trp in liquid-reflux models

| Model | mM of L-trp added | TA98 + S9 Avg. rev. col./pl. | | Inhibition % | |
|---|---|---|---|---|---|
| | | Study 1 | Study 2 | Study 1 | Study 2 |
| Complete[a] | 0 (control) | 545[b] | 1005[b] | control | |
| | 1.75 | 460[b] | — | 15 | — |
| | 3.5 | 235[b] | — | 57 | — |
| | 17 | 230[b] | — | 58 | — |
| | 70 | — | 310[b] | — | 70 |
| | 105 | — | 270[b] | — | 73 |
| | 140 | — | 175 | — | 100 |
| DEG control | — | 50 | 65 | — | — |
| IQ (5 ng/pl) | — | 960[b] | 1210[b] | — | — |
| Critical[c] | 0 (control) | 1290[b] | | control | |
| | 3.5 | 515[b] | | 60 | |
| | 17 | 90 | | 100 | |
| | 70 | 40 | | 100 | |
| DEG control | — | 55 | | — | |
| IQ (5 ng/pl) | — | 610[b] | | — | |

[a]Complete model consisted of glucose (35 mM) + glycine (70 mM) creatinine (70 mM).
[b]Significant levels of mutagenicity
[c]Critical model consisted of threonine (70 mM) + creatinine (70 mM).

TABLE II

Dose-dependent inhibition of IQ-type mutagenicity in *Salmonella typhimurium* TA98 + S9 by L-tryptophan in fried and broiled lean-ground beef.

| | Broiled beef model | | | Fried beef model | |
|---|---|---|---|---|---|
| | Avg. Rev. Col./Plate | | % | Avg. Rev. | % |
| Sample | Study 1. | Study 2. | Inhibition | Col./Pl. | Inhibition |
| Plain patty control | 515[a] | — | | — | |
| SS[b] patty control | 450[a] | 280[a] | | 361[a] | |
| 50 mg L-trp/side (0.69 mg/cm$^2$) | — | 270[a] | 4 | — | |
| 60 mg L-trp/side (0.83 mg/cm$^2$) | — | — | | 279[a] | 23 |
| 75 mg L-trp/side (1.04 mg/cm$^2$) | — | 120 | 100 | 147 | 100 |
| 100 mg L-trp/side (1.38 mg/cm$^2$) | — | 110 | | — | |

TABLE II-continued

Dose-dependent inhibition of IQ-type mutagenicity in
*Salmonella typhimurium* TA98 + S9 by L-tryptophan in fried and broiled
lean-ground beef.

| | Broiled beef model | | | Fried beef model | |
|---|---|---|---|---|---|
| | Avg. Rev. Col./Plate | | % | Avg. Rev. | % |
| Sample | Study 1. | Study 2. | Inhibition | Col./Pl. | Inhibition |
| 150 mg L-trp/side (2.07 mg/cm$^2$) | 115 | — | 100 | — | |
| DMSO control | 55 | 56 | | 59 | |
| IQ (5 ng/plate) | 635$^a$ | 1265$^a$ | | 1024$^a$ | |

$^a$Significant level of mutagenicity (3 times DMSO control values)
$^b$SS = steak sauce. In the broiled beef model, SS, with or without L-trp, was applied (2.5 ml/side or 0.83 ml/cm$^2$) to both patty surfaces prior to broiling side 1. In the fried beef model, SS, with or without L-trp, was applied (2.5 ml/side or 0.83 ml/cm$^2$) to side 1 prior to frying and to side 2 while side 1 was cooking.

L-trp was thus found to be an effective, dose-dependent, inhibitor of the formation of IQ-type mutagenicity, as derived from a complete liquid-reflux model of glucose+glycine+creatinine. We have also shown, in studies not detailed above, that L-trp is a dose-dependent inhibitor in other complete model systems, such as, fructose+alanine+creatinine, and glucose+threonine+creatinine, where the specific IQ-type mutagens formed, and their relative proportions, have been identified by others as well. (Jagerstad, M., Olsson, K., Grivas, S., Negishi, C., Wakabayashi, K., Tsuda, M., Sato, S. and Sugimura, T. (1984) Formation of 2-amino-3,8-dimethyl[4,5f]quinoxaline in a model system by heating creatinine, glycine, and glucose. *Mutat. Res.*, 126, 239–244); Muramatsu, M., and Matsushima, T. (1985) Formation of MeIQ$_x$ and 4,8-diMeIQ$_x$ by heating mixtures of creatinine, amino acids, and monosaccharides. Mutat. Res., 147, 266; Grivas, S. (1985) A convenient synthesis of the potent mutagen 3,4,8-trimethyl-3H-imidazo[4,5-f]quinoxalin-2-amine. *Acta Chemica Scandinavica*, B39, 213–217; Nyhammar, T., Grivas, S., Olsson, K. and Jagerstad, M. (1986) Formation of 4,8-DiMeIQ$_x$ from the model system fructose, alanine, and creatinine; comparison with the isomeric 5,8-DiMeIQ$_x$. *Mutat. Res.*, 174, 5–9; Nagao, M., Yahagi, T., Kawachi, T., Seino, Y., Honda, M., Matsukura, N., Sugimura, T., Wakabayashi, K., Tsuji, K., and Kosuge, T. (1977) Mutagens in foods and especially pryloysis products of protein. In Scott, D., Bridge, B. A., Sobels, F. H. (eds), *Progress in Genetic Toxicology*. Elsevier/North Holland, Amsterdam, p. 259–264). For example, the last two models cited produce predominantly (80%) 4,8-DiMeIQ$_x$. L-trp was also found to completely inhibit the formation of IQ-type mutagenicity from "intermediate" model systems such as 2,5-dimethylpyrazine+threonine+creatinine, and critical models such as glucose+creatinine, glyoxal+creatinine, methylglyoxal+creatinine, and threonine+creatinine.

It was of interest to note that the level of mutagenicity obtained from refluxing glucose (35 mM)+creatinine (70 mM) alone accounted for as much as 88% of the mutagenicity derived from equimolar concentrations of glucose+creatinine+70 mM glycine (360 vs 410 avg. rev. col./plate, respectively). Thus, the presence of free amino acid as a requisite amino group donor in the Maillard reaction scheme for the formation of IQ-type mutagenicity is apparently not as rigid a specification as has been believed. Perhaps some of the creatinine is able to serve as a suitable source of amino groups for precursor formation with reducing substrates such as glucose. In any event, the addition of 70 mM L-trp to such a glucose+creatinine model resulted in 100% inhibition of IQ-type mutagenicity.

Thus, L-trp has been shown to be a virtually "universal", dose-dependent, inhibitor of the formation of IQ-type mutagenicity in liquid reflux models, many of which produce identified mutagens.

The inhibitory effect of L-trp was further validated under realistic cooking conditions using 85% lean-ground beef. The addition of L-trp to a commercial steak sauce, at various concentrations, which was subsequently easily applied to both patty surfaces prior to initial frying (220° C.) or broiling (235° C.) under realistic conditions, resulted in a dose-dependent inhibition of IQ-type mutagenicity, up to 100%, in both cooking models. In both instances, the relatively low dose of 75 mg of L-trp in 2.5 ml of SS/side (1.04 mg/cm$^2$) was sufficient to effect a 100% inhibition.

It has been documented that high temperatures, in the range of 300°–700° C. may produce mutagenic pyrolysis products of amino acids, such as tryptophan and glutamic acid, known as Trp-P-1, Trp-p-2, Glu-P-1, etc. (Nagao, M., Yahagi, T., Kawachi, T., Seino, Y., Honda, M., Matsukura, N., Sugimura, T., Wakabayashi, K., Tsuji, K., and Kosuge, T. (1977) Mutagens in foods and especially pryloysis products of protein. In Scott, D., Bridge, B. A., Sobels, F. H. (eds), *Progress in Genetic Toxicology*. Elsevier/North Holland, Amsterdam, pp. 259–264. These carboline (non-IQ) type mutagens are not as potent as the IQ-type on an equimolar basis but are notably mutagenic Tsuda et al. (Tsuda, M., Negishi, C., Makino, R., Sato, S., Yamaizumi, Z., Hirayama, T. and Sugimura, T. (1985) Use of nitrite and hypochlorite treatments in determination of the contributions of IQ-type and non-IQ-type heterocyclic amines to the mutagenicities in crude pyrolyzed materials. *Mutat. Res.*, 147, 335–341) have found that acidic nitrosation of sample with NaNO$_2$ at pH 1.0 will inactivate any such pyrolysis-derived carboline mutagens, behaving as typical arylamines, while having no effect on IQ-type mutagens with the characteristic 3-methyl-2-aminoimidazole structure. Thus, the relative contribution of each of these classes of mutagen to the total mutagenicity can be assessed. In the present studies, where L-trp has been added as an inhibitor of IQ-type mutagen formation, the potential for formation of carboline type mutagens exists, although minimally so as the realistic cooking temperatures and time employed (220°–235° C. for 5 min/side). However, any such carboline mutagens formed would tend to offset, or effectively reduce the overall inhibitory effect of L-trp. This would translate into a decrease in the % inhibition achieved at any given level of L-trp added. It follows that inactivation of carboline mutagens by acidic nitrosation, if present, would eliminate this offsetting mutagenic factor, and the apparent effectiveness (% inhibition) by L-trp would increase.

Thus, the avg. rev. col./plate would be reduced after acidic nitrosation of sample basic extract if carboline mutagens were present. This was not, however, found to be the case. Acidic nitrosation of sample basic extract from patties treated with 150 mg L-trp in 2.5 ml SS/side prior to broiling resulted in a greater number of avg. rev. col./plate (260), rather than 110/plate before nitrosation, and only 42% inhibition, rather than 100%. It has thus been concluded that added L-trp for inhibitory purposes does not lead to the formation of significant levels of carboline-type mutagens under the relatively low temperature conditions (220°–235° C.) employed in the present frying and broiling models.

The % inhibition of IQ-type mutagenicity results obtained in the fried beef model were very similar to those obtained in the broiled beef model, so long as the SS, containing similar levels of L-trp, was applied to both surfaces of the meat prior to the initiation of either mode of cooking. Thus, an important parameter of L-trp effectiveness is that it must be present initially even on that side of the meat not directly exposed to the hottest temperatures during the cooking of the first side of the patty, that is, the upper surface of the patty being fried, or the lower surface of the patty being broiled. Apparently, temperatures on these "cooler" surfaces during the cooking of the first side, are sufficient to generate low, but significant, levels of IQ-type mutagenicity, unless L-trp is present on these surfaces. For example, preliminary fried and broiled lean-ground beef studies showed that if each, individual surface was treated just prior to cooking, then the maximum % inhibition attainable was about 70% at 75 mg L-trp in 2.5 ml SS/side. However, where both surfaces were treated prior to initial frying or broiling, 100% inhibition was achieved at this same dose of L-trp.

In both cooking models, the L-trp inhibitory effect shows a sharp inflection at around 50 mg L-trp/side (0.69 mg/cm$^2$). This steep change in the dose-response curve for inhibition, between 50 and 75 mg L-trp/side, is considered to be related to the as yet "unknown" mechanism by which L-trp inhibits the formation of IQ-type mutagens. One possibility is that L-trp acts as an effective "trap" for Maillard reactive-derived IQ precursors. Normally, in the absence of L-trp, an excess of precursors is produced that exceeds the amount of creatinine available for the synthesis of IQ-type mutagens, so that creatinine is the limiting substrate. Low levels of L-trp ($<50$ mg/side), react with or sequester precursors effectively but not to the point where their concentration becomes limiting. Precursors also may react preferentially with creatinine at low L-trp concentrations. Beyond a critical point ($<50$ mg L-trp/side), however, the effective "trapping" of precursors by L-trp rapidly causes a lack of sufficient precursor, and precursor availability then becomes the limiting factor in IQ-type mutagen formation, rather than creatinine concentration, as is normally the case.

In conclusion, L-trp inhibited the formation of IQ-type mutagenicity virtually completely when added to various liquid-reflux model systems or to lean-ground beef prior to frying or broiling realistically. Because L-trp is an essential amino acid and non-troxic substance, and because the realistic cooking temperatures employed (220°–235° C.) were not shown to result in the formation of any significant levels of tryptophan pyrolysis-derived mutagens (e.g., Trp-P-1, etc.), L-trp may be safely and prudently employed to virtually eliminate the formation of IQ-type carcinogens in beef by application to both surfaces of the mean prior to cooking. L-trp can also be applied to lamb, chicken and fish and all proteinous foodstuff to achieve the same result. Furthermore, it can also be sprinkled on foodstuffs in dry form or painted on when dissolved in a carrier or solvent (e.g. water).

There will now be obvious to those skilled in the art many modifications and variations in the procedures and products set forth hereinabove. These modifications and variations will not depart from the scope of the invention if defined by the following claims.

What is claimed is:

1. A method of inhibiting the development of mutagens/carcinogens during the cooking of a protein containing foodstuff comprising applying L-Tryptophan to the foodstuff in an amount sufficient to inhibit the development of mutagens/carcinogens during the cooking of the foodstuff, and cooking the foodstuff with the L-Tryptophan thereon.

2. A method as claimed in claim 1 comprising broiling the foodstuff with the L-Tryptophan thereon.

3. A method as claimed in claim 1 comprising frying the foodstuff with the L-Tryptophan thereon.

4. A method as claimed in claim 1 comprising applying the L-Tryptophan to the surface of the foodstuff.

5. A method as claimed in claim 4 comprising sprinkling the L-Tryptophan on the foodstuff.

6. A method as claimed in claim 4 comprising incorporating the L-Tryptophan into a liquid flavoring agent which is applied to the foodstuff.

7. A method as claimed in claim 4 wherein the foodstuff has first and second sides, comprising applying the L-Tryptophan to both said sides.

8. A method as claimed in claim 4 comprising applying the L-Tryptophan to the surface in an amount at least in the order of magnitude of 1.00 mg. per cm. sq.

9. A method as claimed in claim 1 wherein the foodstuff is meat or fish.

10. A method as claimed in claim 1 wherein the inhibiting of mutagens is constituted by the inhibiting of IQ type carcinogens.

11. A method as claimed in claim 1 comprising incorporating the L-Tryptophan in a carrier.

12. A method as claimed in claim 11 wherein the carrier is water, or a gelatin solution.

13. A method as claimed in claim 11 wherein the carrier is a sauce.

14. A method as claimed in claim 1 wherein the foodstuff is beef, lamb, pork, fowl, or fish.

15. A method as claimed in claim 1 wherein the foodstuff is hamburger.

16. A method as claimed in claim 7 wherein one of the sides at a time is directly exposed to heat, comprising applying the L-tryptophan to both sides before the heat is applied substantially to either side.

17. A method as claimed in claim 1 comprising baking the foodstuff with L-tryptophan.

18. A food item comprising a protein containing foodstuff and a mutagen/carcinogen inhibitor thereon, said inhibitor including L-tryptophan in an amount sufficient to inhibit the formation of the mutagens/carcinogens during cooking of the foodstuff.

19. A food item as claimed in claim 16 comprising a carrier for the L-tryptophan.

20. A food item as claimed in claim 18 wherein the L-tryptophan is soluble or suspended in said carrier.

21. A food item as claimed in claim 18 wherein said carrier is a sauce adapted for use with foodstuff.

22. A foodstuff prepared as claimed in claim 1.

* * * * *